United States Patent
Rook

(10) Patent No.: US 10,200,385 B2
(45) Date of Patent: Feb. 5, 2019

(54) ADDRESSING INSIDE-ENTERPRISE HACK ATTEMPTS

(71) Applicant: Sony Interactive Entertainment America LLC, San Mateo, CA (US)

(72) Inventor: Derek Rook, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 170 days.

(21) Appl. No.: 15/278,268

(22) Filed: Sep. 28, 2016

(65) Prior Publication Data

US 2018/0091530 A1 Mar. 29, 2018

(51) Int. Cl.
*H04L 29/06* (2006.01)
*G06F 21/55* (2013.01)

(52) U.S. Cl.
CPC ........ *H04L 63/1416* (2013.01); *G06F 21/554* (2013.01); *H04L 63/1441* (2013.01)

(58) Field of Classification Search
CPC ............... H04L 63/146; H04L 63/1441; H04L 63/1416; G06F 21/554
See application file for complete search history.

(56) References Cited

U.S. PATENT DOCUMENTS

| | | | |
|---|---|---|---|
| 6,070,244 A * | 5/2000 | Orchier ............... | G06F 21/6218 709/223 |
| 7,085,936 B1 * | 8/2006 | Moran ................... | G06F 21/552 726/5 |
| 9,807,104 B1 * | 10/2017 | Sarra .................... | H04L 63/1416 |
| 2003/0101359 A1 * | 5/2003 | Aschen .................... | G06F 21/55 726/23 |
| 2004/0059951 A1 * | 3/2004 | Pinkas ..................... | G06F 21/34 726/5 |
| 2004/0176161 A1 | 9/2004 | Shelby et al. | |
| 2006/0200862 A1 | 9/2006 | Olson et al. | |
| 2011/0126273 A1 * | 5/2011 | Bhatia ..................... | G06F 21/31 726/7 |
| 2011/0289210 A1 | 11/2011 | Kelley et al. | |
| 2013/0247184 A1 | 9/2013 | Mahadik et al. | |
| 2014/0181968 A1 | 6/2014 | Ge et al. | |
| 2016/0164893 A1 * | 6/2016 | Levi .................... | H04L 63/1416 726/23 |
| 2016/0226905 A1 | 8/2016 | Baikalov et al. | |
| 2018/0091528 A1 * | 3/2018 | Shahbaz ............. | H04L 63/1416 |

* cited by examiner

*Primary Examiner* — Matthew Smithers
(74) *Attorney, Agent, or Firm* — John L. Rogitz

(57) ABSTRACT

An enterprise computer network is monitored to detect and neutralize security breaches. In a first case failed login attempts to multiple target machines are noted and if they come from one machine or a small number of originating machines, a password spraying attack from the originating machines is indicated, resulting in the originating machines being segregated from the system. In another case, multiple indicators of compromise are used to determine whether an enterprise machine is infected with malware and only if multiple indicators are present is the machine segregated from the system.

20 Claims, 6 Drawing Sheets

ADDRESSING INSIDE-ENTERPRISE HACK ATTEMPTS

FIELD

The application relates generally to addressing inside-enterprise hack attempts.

BACKGROUND

Modern security threats are capable of executing complex attacks very rapidly through automated means. These attacks can take place at any time, unsympathetic to business hours or personnel schedules. To detect these attacks, analysts take time to receive alerts, manually correlate them to identify credible threats, determine a course of action and then implement incident handling processes systems/services. This results in delays for security analysts who are often reacting to a compromise rather than reacting to an event or preventing a successful attack.

A common solution to this issue is to place a device inline to the communication, actively inspecting all traffic that passes through it and passing judgement on whether to block it or not. However, active techniques introduces performance reduction in the form of latency, which is unacceptable in an extreme latency sensitive environment such as streaming or financial trading networks. Also, such active solutions are typically blind to contextual information streaming in from other systems in other parts of the network; it is only able to pass judgement on each packet (or sequence of packets) in a vacuum. Moreover, many existing tools that profess to provide this level of analysis are expensive, and often require the company to lock themselves into using only a specific set of tools in order to achieve any significant level of correlation and interoperability.

SUMMARY

Accordingly, present principles address the above concerns. Specifically, present principles provide a passive out-of-line monitor that consumes one or more sources of data internal to an enterprise, including emails, short message service (SMS) pages, logs, streaming data, etc. With this information events from disparate systems can be correlated over time to facilitate making high confidence decisions about various types of traffic. If malicious activity is detected, in-place networking equipment, computers systems, kinetic industrial control systems (ICS) devices, or any other device already used to process and regulate normal data or traffic can be controlled to perform mitigating actions on that device.

The disclosure allows for automated threat mitigation while removing the performance decrease provided by typical active intrusion prevention systems and allowing for complex data correlation to ensure accuracy for threat detection.

Accordingly, a device includes one or more computer memories that are not a transitory signal and that include instructions executable by at least one processor to identify login attempts at plural target computers. The instructions are executable to identify one or more originating computers from which the login attempts were made, identify, among the login attempts, failed login attempts, and determine whether a number of failed login attempts to plural target computers originated at a first originating computer satisfies a threshold. The instructions are executable to, responsive to determining that a number of failed login attempts to plural target computers originated at the first originating computer satisfies the threshold, conduct corrective action with respect to the first originating computer. The instructions also are executable to, responsive to determining that a number of failed login attempts to plural target computers originated at the first originating computer does not satisfy the threshold, not conduct corrective action with respect to the first originating computer.

In some examples the instructions may be executable to determine whether a number of failed login attempts to plural target computers originate at fewer than "N" originating computers, wherein "N" is an integer greater than one, and with the "N" originating computers establishing the first computer.

The corrective action can include instructing a switch associated with the first computer to deactivate a communication port. The corrective action may include instructing a switch associated with the first computer to associate the port with a new network. The corrective action may also or alternatively include sending an electronic alert message to one or more computers associated with authorized computer operators.

In examples, the target computers and the originating computers are all in a network associated with a single enterprise. The computer memory and processor may be implemented in a server computer that is not in-line between the originating computers and target computers. The instructions can be executable to digitally sign a message containing a command to take the corrective action.

In another aspect, a device includes one or more computer memories that are not a transitory signal and that include instructions executable by at least one processor to access at least a first source of information, and access at least a second source of information. The instructions are executable to, based on data from the first and second sources of information, determine whether an initial indicator of compromise exists. The instructions are executable to, responsive to determining that the initial indicator of compromise exists, determine whether the initial indicator correlates to a secondary indicator of compromise, and responsive to determining that the initial indicator correlates to the secondary indicator, execute corrective action. Otherwise, i.e., if the initial indicator does not correlate to the secondary indicator, the corrective action is not executed.

In another aspect, a method includes monitoring an enterprise computer network to detect and neutralize security breaches. The monitoring may include noting failed login attempts to multiple target machines and responsive to a number of failed login attempts satisfying a test are detected as originating from one machine or a small number of originating machines, indicating a password spraying attack from the originating machines, resulting in the originating machines being segregated from the network. In addition or alternatively, the monitoring may include using multiple indicators of compromise to determine whether an enterprise machine is infected with malware and only if multiple indicators are present, segregating the enterprise machine from the network.

The details of the present application, both as to its structure and operation, can best be understood in reference to the accompanying drawings, in which like reference numerals refer to like parts, and in which:

DETAILED DESCRIPTION

Figure 1:
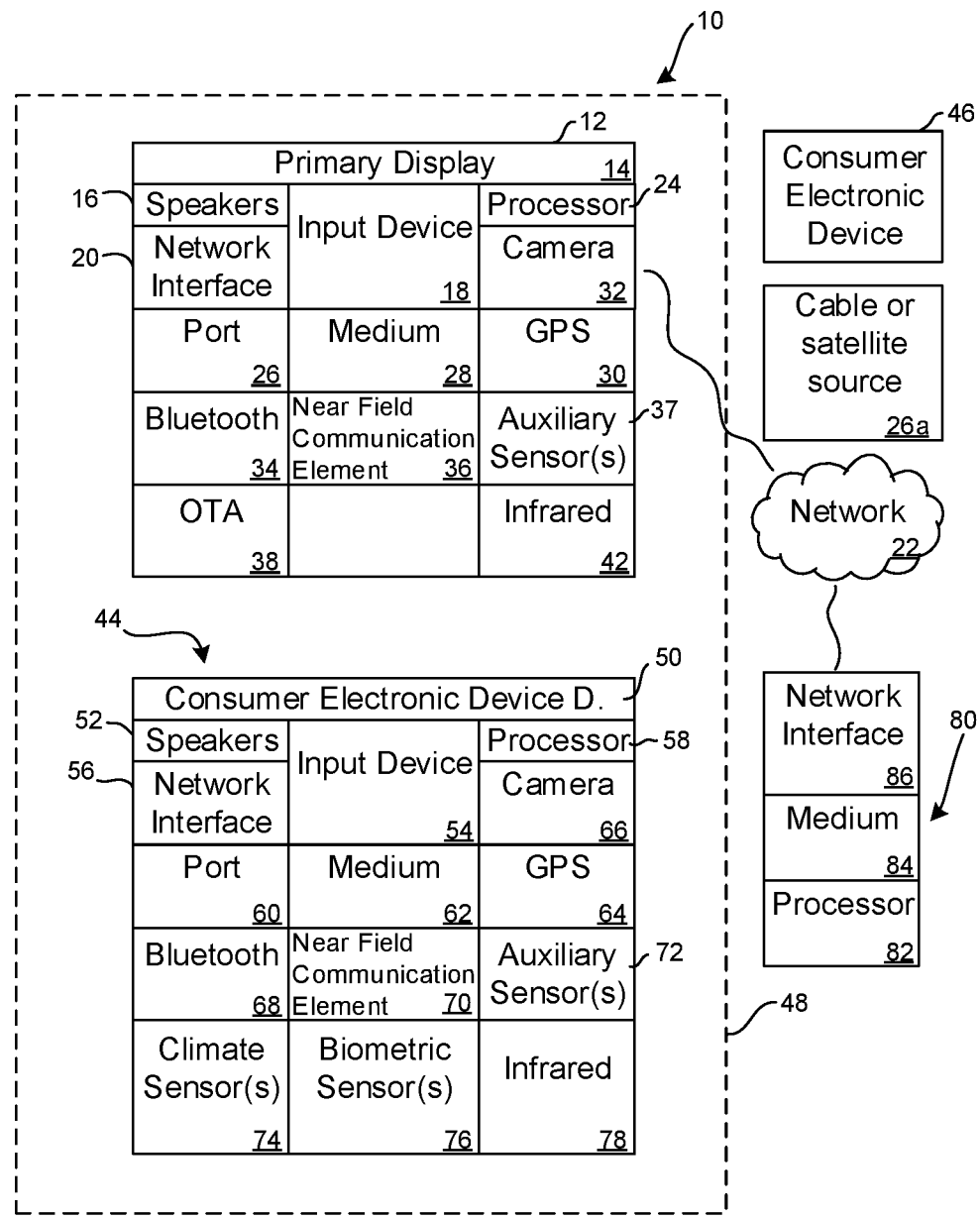
FIG. 1 is a block diagram of an example system including an example in accordance with present principles.

This disclosure relates generally to computer ecosystems including aspects of consumer electronics (CE) device networks such as but not limited to distributed computer game networks. A system herein may include server and client components, connected over a network such that data may be exchanged between the client and server components. The client components may include one or more computing devices including game consoles such as Sony Playstation™, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as but not limited to Sony PlayStation™ and Microsoft Xbox™, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Python, Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
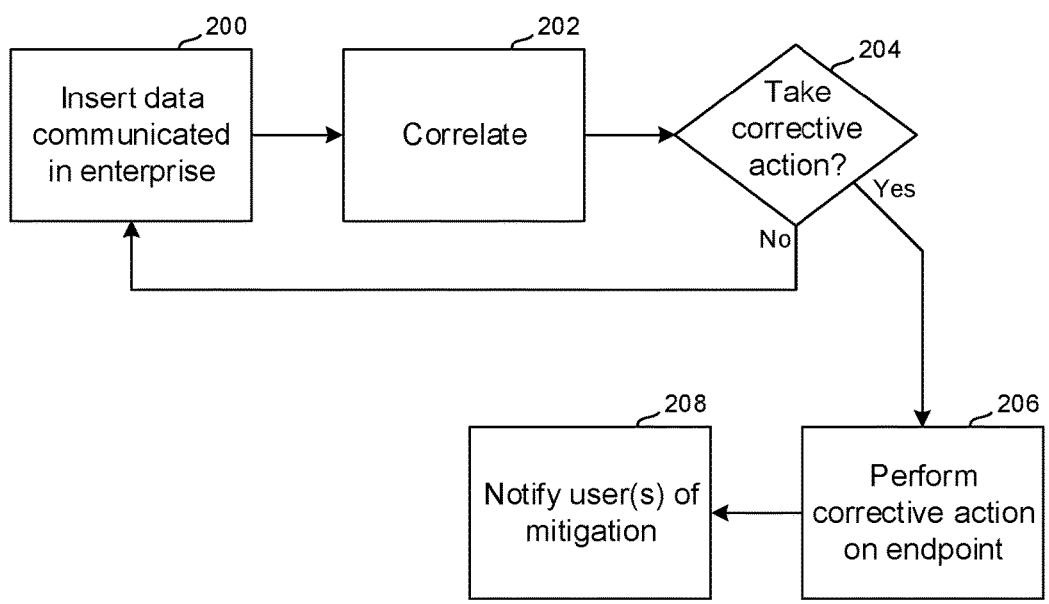
FIG. 2 is a flow chart of high level logic.

Turning to FIG. 2, a high level flow chart is shown. At block 200 data is ingested that originated from one or more enterprise sources such as any noted above. Note that the data may be logged prior to ingestion, and that validation of the correctness of all source data logging may be executed.

Moving to block 202, data is correlated to other similar data using, e.g., pattern matching algorithms. Based on the correlation, at decision diamond 204 it is determined whether to take corrective action. If so, such corrective action is performed on an endpoint at block 206; otherwise, the logic loops back to block 200.

In sending a message to an endpoint at block 206 to perform corrective action, the message may be cryptographically signed, and the endpoint may be programmed to validate all message signatures as they are processed. Any message that does not contain a valid signature will be considered corrupted and unusable. In this way, it is more difficult to send inauthentic messages to render an endpoint non-functional. In other words, messages preferably are signed by the message producer to help prevent forged messages intended to trick the system into committing malicious activity such as taking an endpoint offline when nothing is wrong with the endpoint. Signatures preferably are verified by endpoints receiving the messages prior to a mitigation application programming interface (API) call being made, and the message is ignored if the signature is not verified.

Note that if desired, all API keys or other credentials required by mitigation endpoints may be created with the least privilege possible, ensuring that they are able to complete their task but cannot be leveraged for privilege escalation or other unintended malicious activity.

If desired, at block 208 alerts or notifications of automated mitigations may be sent to one or more designated users, e.g., via email or SMS. Users can also interact with the system directly via command lines to view status of active mitigations, manually trigger an action, reverse an active mitigation/whitelist a host, or disable the system completely (due to an emergency situation).

While FIG. 2 has numerous applications in and was specifically designed for information security, its principles may also be used for physical security and other automated systems. Thus, while the below-described use cases are provided, it is to be understood that present principles may also apply to statistical analysis and anomaly detection within an enterprise to help better identify possible threats that would be difficult to recognize with standard pattern or threshold matching. The passive monitoring system described herein may be modular (e.g., a module provided for each block in FIG. 2) to allow for easy extensibility and facilitate a wide array of defensive mitigations.

Figure 3:
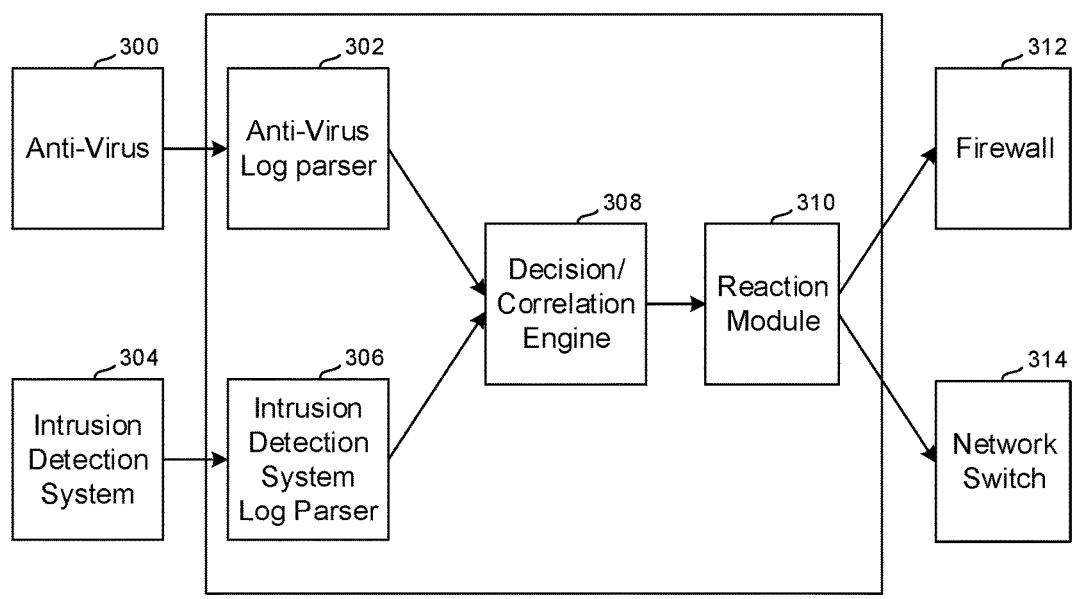
FIG. 3 is a block diagram of an example system architecture.

FIG. 3 is a block diagram of an example architecture that may be used. As shown, a database or log of other data structure 300 indicating or recording anti-virus programs, alerts, viruses, etc. is accessed by an anti-virus parser 302 to verify authenticity of the data received from the data structure 300. Also, an intrusion detection system (IDS) log or a domain name system (DNS) log or other data structure 304 may be accessed by a parser 306 (such as an IDS parser or a DNS parser, depending on the log technology) for verifying authenticity of the data in the data structure 306, essentially correlating secondary indicators. The parsers 302, 306 send verified data to a decision/correlation engine 308, which determines, based on the verified information, whether a computer security threat is detected. If it is, the engine 308 signals the threat to a reaction module 310, which translates the information received from the engine 308 into application programming interface (API) calls and sends the calls to specific endpoints such as a firewall 312 and a network switch 314 to block malicious communication traffic.

Figure 5:
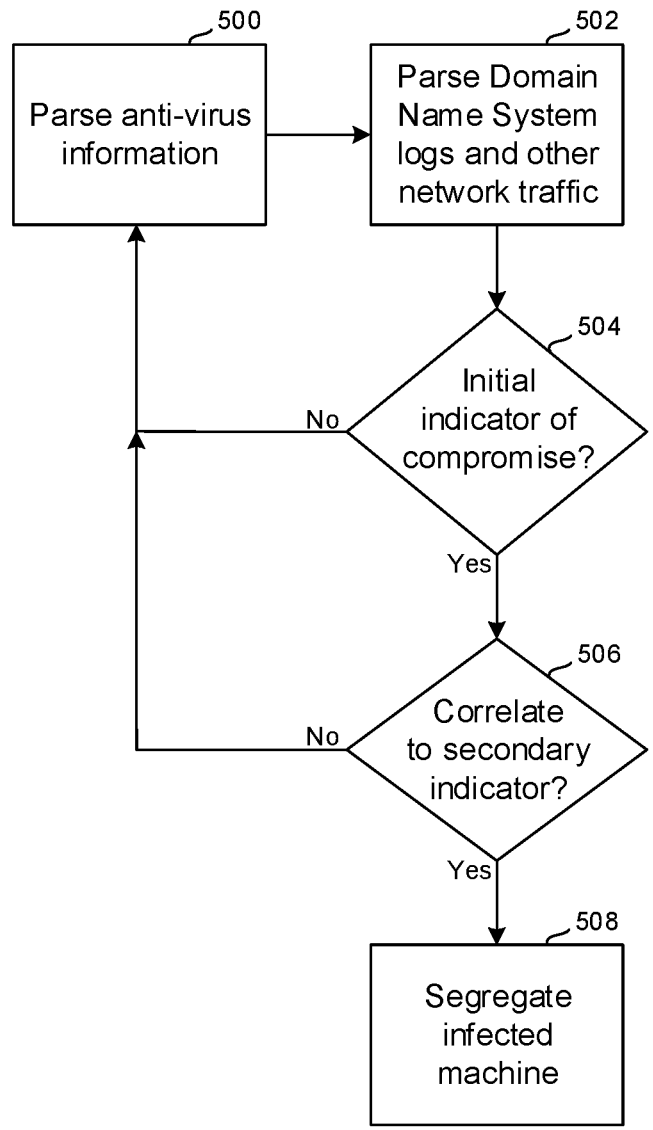
FIG. 5 is a flow chart of example logic for a second use case.
Figure 6:
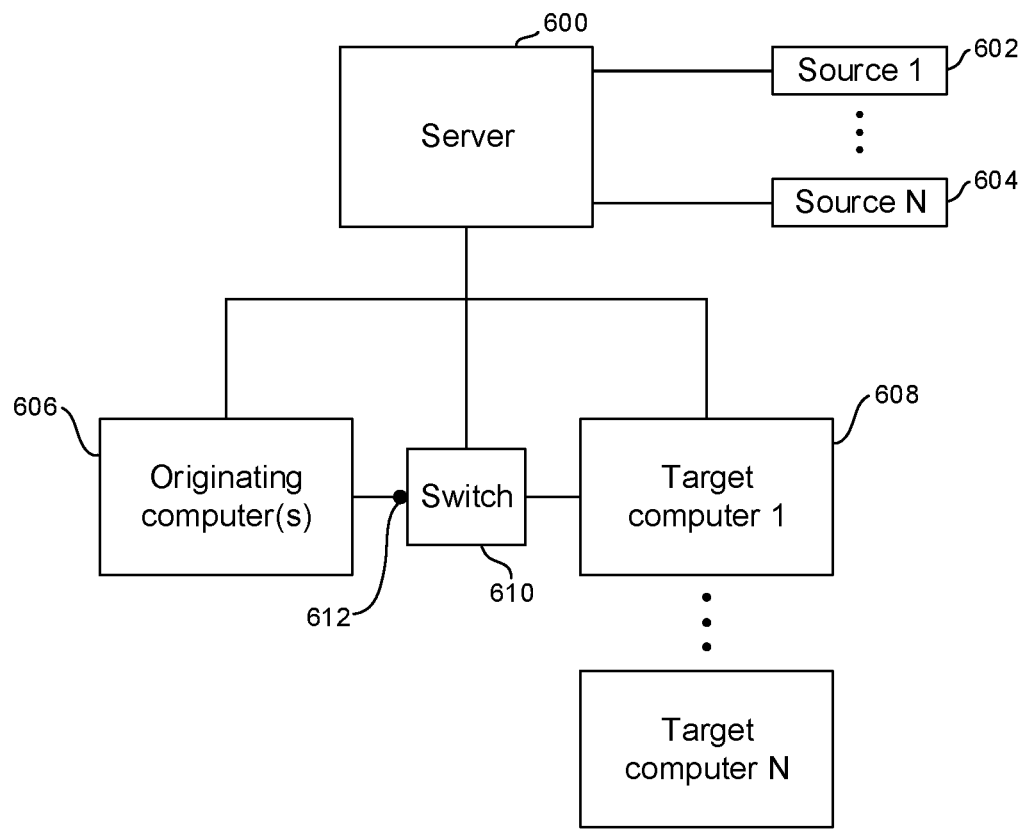
FIG. 6 is a block diagram of an example enterprise computer system.

Note that as shown in FIG. 6 and described further below, the logic of FIGS. 4 and 5 may be implemented in a server computer that is not in-line between the originating computers and target computers.

Figure 4:
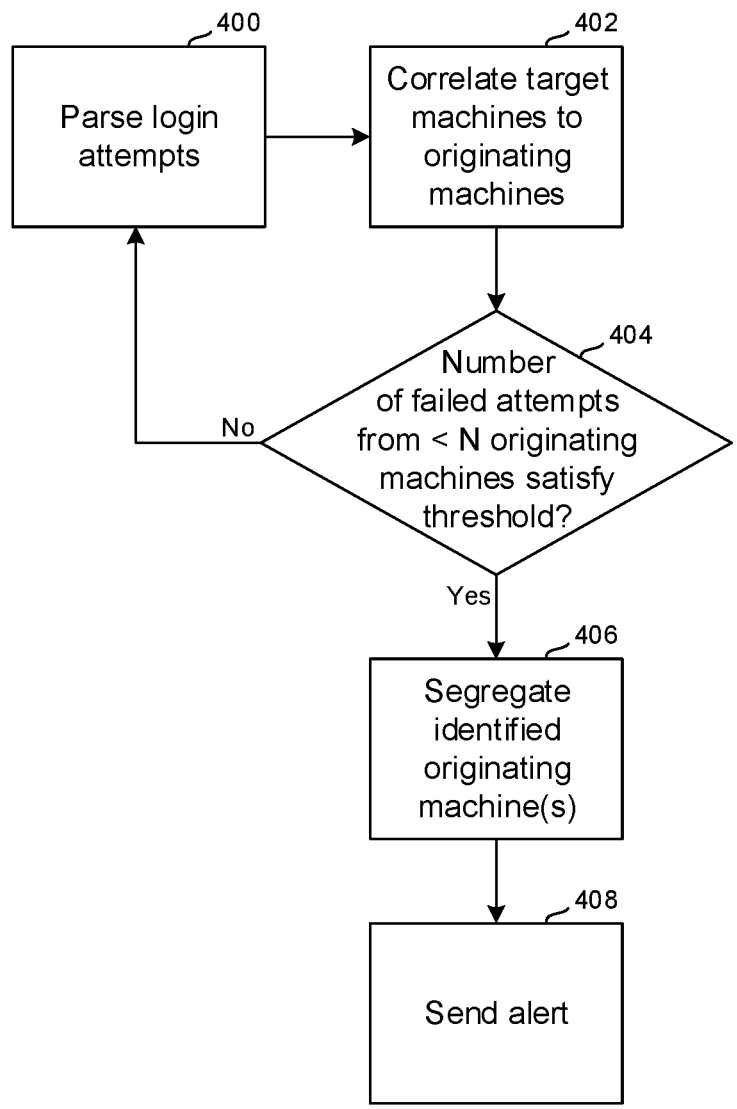
FIG. 4 is a flow chart of example logic for a first use case.

FIG. 4 shows logic for detecting a password spraying attack within an enterprise from a possibly compromised enterprise computer. Password spraying is an attack that attempts to bypass unauthorized login attempt lockout policies by selecting a few highly popular passwords and submitting them across a large number of users and/or computers, assuming that statistically one of the users will have used one of those passwords. This is contrary to a more popular brute force password attack where a large quantity of popular passwords is attempted against a single user, which would often lock that account out and alert the administrators to foul play.

To detect a password spraying attack, login attempts of many machines across the enterprise are parsed at block 400 to determine which machines originated login attempts and which machines were the targets of those attempts.

At block 402 the information at block 400 correlated against the originating machine of those login attempts. When a relatively high number of failed login attempts originating from one or a few machines is detected at decision diamond 404, automated mitigation is triggered at block 406. More generally, at diamond 404 it may be determined whether a number of failed login attempts to plural target computers originated at a first originating computer satisfies a threshold or test. If the threshold or test is satisfied, mitigation is indicated; otherwise, it is not. Also, at diamond 404 it may generally be determined whether a number of failed login attempts to plural target computers originate at fewer than "N" originating computers, wherein "N" is an integer greater than or equal to one.

The mitigation may include segregating the originating hosts from which the password spraying was detected from the primary network and sending alerts to the administrators at block 408. This segregation may be achieved by commanding the network switch to which an offending machine is connected to either turn off its port or to move its port to a new network such as a new virtual local area network (VLAN) that exists on a more restricted network. Messages bearing mitigation commands may be digitally signed, and a recipient will take the corrective action only if the signature is valid, to prevent maliciously taking otherwise good machines offline.

Turning to FIG. 5, a technique for malware mitigation and lateral infection prevention is shown. As understood herein, malware is dangerous because it not only infects a host, but then attempts to infect other hosts in the environment and even phones home for further instructions (generally to look for sensitive information, exfiltration, destruction, etc.).

To detect a possible infection, gain high confidence in its detection, and then mitigate the threat, the logic accesses multiple sources of information as shown in FIG. 3 and indicated at block 500 (parsing anti-virus information) and block 502 (parsing DNS logs and other network traffic.) By processing anti-virus alert emails, DNS logs (correlating resolution lookups with open sourced threat intel to detect attempts to reach known bad domains), and other network traffic, present principles can detect, at decision diamond 504, an initial indicator of compromise, correlate it with secondary indicators at decision diamond 506, and once a high level of confidence is achieved, segregate the infected host from the network at block 508 to prevent further lateral infections or communication with its command and control servers.

In one example, an initial indicator may be, for example, an unusually high number of attempts by a first machine to contact or query another machine. When this is detected, an example non-limiting secondary indicator may be to parse the queries to determine if any are associated with a known virus operation.

FIG. 6 illustrates that server 600 may be used to perform the logic above. The server may access data sources 602, 604, which may be any of the data sources described previously. The server 600 may passively monitor originating computers 606 and target computers 608 but is not in-line with them. The server 600 may control one or more switches 610 each having one or more ports 612 as mentioned above to mitigate threats according to disclosure herein.

In some implementations, two nodes may be provided in each enterprise zone to execute the logic herein, operating in an active/passive mode. Each node may expose https endpoints for the purposes heartbeat health monitoring and sharing of mitigation state information. The heartbeat can be a simple GET request expecting a 200 Ok response in return. Sending state information to other nodes can take the form of a POST request with the relevant information in JSON format being sent. Both client and server certificates for these transactions can be verified to ensure authentication and confidentiality.

It will be appreciated that whilst present principals have been described with reference to some example embodiments, these are not intended to be limiting, and that various alternative arrangements may be used to implement the subject matter claimed herein.

What is claimed is:

1. A device comprising:
at least one computer memory that is not a transitory signal and that comprises instructions executable by at least one processor to:
identify login attempts at plural target computers;
identify one or more originating computers from which the login attempts were made;
identify, among the login attempts, failed login attempts;
determine whether a number of failed login attempts to plural target computers originated at a first originating computer satisfies a threshold;
responsive to determining that a number of failed login attempts to plural target computers originated at the first originating computer satisfies the threshold, conduct corrective action with respect to the first originating computer including segregating the first computer from a network associated with the plural target computers;
responsive to determining that a number of failed login attempts to plural target computers originated at the first originating computer does not satisfy the threshold, not conduct corrective action with respect to the first originating computer.

2. The device of claim 1, wherein the instructions are executable to determine whether a number of failed login attempts to plural target computers originate at fewer than "N" originating computers, wherein "N" is an integer greater than one, the "N" originating computers establishing the first computer.

3. The device of claim 1, wherein the corrective action includes instructing a switch associated with the first computer to deactivate a communication port.

4. The device of claim 1, wherein the corrective action includes instructing a switch associated with the first computer to associate the port with a new network.

5. The device of claim 1, wherein the target computers and the originating computers are all in a network associated with a single enterprise.

6. The device of claim 1, wherein the computer memory and processor are implemented in a server computer that is not in-line between the originating computers and target computers.

7. The device of claim 1, wherein the instructions are executable to digitally sign a message containing a command to take the corrective action.

8. The device of claim 1, comprising the at least one processor.

9. A device comprising:
at least one computer memory that is not a transitory signal and that comprises instructions executable by at least one processor to:
access at least a first source of information;
access at least a second source of information;
based on data from the first and second sources of information, determine whether an initial indicator of compromise exists;
responsive to determining that the initial indicator of compromise exists, determine whether the initial indicator correlates to a secondary indicator of compromise;
responsive to determining that the initial indicator correlates to the secondary indicator, digitally sign a message containing a command to execute corrective action; and
responsive to determining that the initial indicator does not correlate to the secondary indicator, not execute corrective action.

10. The device of claim 9, wherein the first source of information includes a repository of anti-virus alert emails.

11. The device of claim 10, wherein the second source of information includes at least one domain name service (DNS) log.

12. The device of claim 9, wherein the second source of information includes at least one domain name service (DNS) log.

13. The device of claim 9, wherein the initial indicator of compromise is a resolution lookup message.

14. The device of claim 13, wherein the second indicator of compromise is an attempt to contact a known compromised network domain.

15. The device of claim 9, wherein the second indicator of compromise is an attempt to contact a known compromised network domain.

16. The device of claim 9, comprising the at least one processor.

17. A method comprising:
monitoring an enterprise computer network to detect and neutralize security breaches, the monitoring including at least one of:
noting failed login attempts to multiple target machines and responsive to a number of failed login attempts satisfying a test are detected as originating from one machine or a small number of originating machines, indicating a password spraying attack from the originating machines, resulting in the originating machines being segregated from the network; and/or
using multiple indicators of compromise to determine whether an enterprise machine is infected with malware and only if multiple indicators are present, segregating the enterprise machine from the network.

18. The method of claim 17, comprising:
noting failed login attempts to multiple target machines and responsive to a number of failed login attempts satisfying a test are detected as originating from one machine or a small number of originating machines, indicating a password spraying attack from the originating machines, resulting in the originating machines being segregated from the network.

19. The method of claim 17, comprising:
using multiple indicators of compromise to determine whether an enterprise machine is infected with malware and only if multiple indicators are present, segregating the enterprise machine from the network.

20. The method of claim 17, wherein the method is executed by a computer that is not in-line between the originating computers and the target computers.

* * * * *